US010252939B2

(12) United States Patent
Yuan et al.

(10) Patent No.: US 10,252,939 B2
(45) Date of Patent: Apr. 9, 2019

(54) HIGH-HARDNESS TRANSPARENT GLASS CERAMIC AND PREPARATION METHOD THEREFORE

(71) Applicant: CDGM GLASS CO., LTD, Chengdu, Sichuan (CN)

(72) Inventors: Baoping Yuan, Chengdu (CN); Tianlai Yu, Chengdu (CN); Xuejian Su, Chengdu (CN)

(73) Assignee: CDGM GLASS CO., LTD, Chengdu (CN)

( * ) Notice: Subject to any disclaimer, the term of this patent is extended or adjusted under 35 U.S.C. 154(b) by 0 days.

(21) Appl. No.: 15/514,023

(22) PCT Filed: Sep. 22, 2015

(86) PCT No.: PCT/CN2015/090236
§ 371 (c)(1),
(2) Date: Mar. 24, 2017

(87) PCT Pub. No.: WO2016/078473
PCT Pub. Date: May 26, 2016

(65) Prior Publication Data
US 2017/0283307 A1     Oct. 5, 2017

(30) Foreign Application Priority Data

Nov. 19, 2014   (CN) .......................... 2014 1 0663503

(51) Int. Cl.
| | |
|---|---|
| C03C 10/02 | (2006.01) |
| C03B 32/02 | (2006.01) |
| C03C 10/00 | (2006.01) |
| C03C 3/085 | (2006.01) |
| C03C 3/095 | (2006.01) |
| C03C 3/097 | (2006.01) |

(52) U.S. Cl.
CPC .......... C03C 10/0045 (2013.01); C03B 32/02 (2013.01); C03C 3/085 (2013.01); C03C 3/095 (2013.01); C03C 3/097 (2013.01); C03C 2204/00 (2013.01)

(58) Field of Classification Search
CPC ............................. C03C 10/00; C03C 10/0045
See application file for complete search history.

(56) References Cited

U.S. PATENT DOCUMENTS

| | | | |
|---|---|---|---|
| 3,681,102 A * | 8/1972 | Beall ...................... | C03C 4/12 252/301.6 F |
| 5,476,821 A | 12/1995 | Beall et al. | |
| 5,968,857 A | 10/1999 | Pinckney | |
| 6,197,429 B1 * | 3/2001 | Lapp ................... | C03C 10/0036 428/428 |
| 6,248,678 B1 | 6/2001 | Pinckney | |
| 8,853,110 B2 * | 10/2014 | Almoric ................. | C03C 3/085 428/426 |
| 9,236,075 B2 * | 1/2016 | Monnono ................ | C03C 1/00 |
| 9,908,809 B2 * | 3/2018 | Momono ............ | C03C 10/0045 |
| 2012/0114955 A1 | 5/2012 | Almoric et al. | |
| 2014/0141285 A1 * | 5/2014 | Monnono ................ | C03C 1/00 428/846.9 |
| 2016/0355434 A1 * | 12/2016 | Momono ................ | B32B 17/06 |
| 2018/0141853 A1 * | 5/2018 | Momono ............. | C03C 21/002 |

FOREIGN PATENT DOCUMENTS

| | | | | |
|---|---|---|---|---|
| CN | 1254688 A | | 5/2000 | |
| CN | 103298760 A | | 9/2013 | |
| JP | 63060127 A | * | 3/1988 | ......... C03C 10/0045 |
| TW | 506952 B | | 10/2002 | |

OTHER PUBLICATIONS

Dec. 31, 2015 Search Report issued in International Patent Application No. PCT/CN2015/090236.

* cited by examiner

Primary Examiner — Karl E Group
(74) Attorney, Agent, or Firm — Oliff PLC

(57) ABSTRACT

A high-hardness transparent glass ceramic and a preparation method therefor, wherein the components by weight percentage include: 55.0%-70.0% of $SiO_2$, 15.0%-20.0% of $Al_2O_3$, 0%-10.0% of MgO, and 0%-12.5% of ZnO, necessarily including one of MgO or ZnO, and the crystallized glass thereof contains microcrystals of spinel crystal. In the present invention, a suitable precursor glass is subjected to thermal treatment, and microcrystals are separated from the glass substrate by crystallization, producing a glass ceramic having a Moh's hardness greater than 7 and a visible-light transparency rate greater than 80% through 1 mm of the glass. The glass ceramic of the invention overcomes the problem that ordinary optical glass is easy to be scratched. The present glass ceramic can be served as protective face for mobile phones, protective glass for optical instruments and in communications equipment, substrate for magnetic disks, LCD panel, or protective glass for other optoelectronic devices.

10 Claims, No Drawings

HIGH-HARDNESS TRANSPARENT GLASS CERAMIC AND PREPARATION METHOD THEREFORE

TECHNICAL FIELD

The present invention relates to a high-hardness transparent glass ceramic and a preparation method therefor, belonging to the technical field of glass ceramics.

BACKGROUND

Since entrance of the touch era marked by Apple products, the capacitive touch screen has become the first choice for mobile phones, tablet personal computers and touch laptops by virtue of its stable performance and good touch. No matter what touch technology is, the cover is always a necessary protective part. While the glass cover has been the mainstream of cover with the aid of high permeability and strong scratch resistance.

In the current market, the Moh's hardness value of high-alumina silicate cover glass is generally 6. Moreover, glass elements under this resistance are assembled to mobile phones, tablet personal computers and touch laptops. However, when gravel or dust containing silicon dioxide ($SiO_2$, with Moh's hardness of 7H) rubs cover glass of the smart phone, it is easy to result in scratches and minor damages, which not only shortens the service life of equipment, but also increases maintenance cost.

For the purpose of improving the hardness of glass cover, some merchants have begun to pay attention to sapphire glass with Moh's hardness of 9H. If the Moh's hardness of cover material is greater than 7H, wear caused by gravels can be resisted. The impact resistance of sapphire is stronger than that of glass, but compared to high-alumina silicate glass, the price of sapphire glass is exceeded by about 10 times, and energy consumed by the sapphire glass by about 100 times. For the visible light transmittance through 1 mm of the sapphire is 80%, the transmittance is rather low. This results in shortening the life of battery and being easy to break.

Glass ceramic is a multi-phase solid material containing a large number of microcrystals obtained by controlling glass crystallization during glass heat treatment. Furthermore, it also has the advantages of high transparency of glass and good mechanical property of ceramic. Hence, an effective way to improve glass hardness is provided.

SUMMARY

The technical problem to be solved by the present invention is to provide a high-hardness transparent glass ceramic.

The present invention further provides a preparation method for a high-hardness transparent glass ceramic.

To solve the technical problem, the present invention provides a high-hardness transparent glass ceramic containing the following components by weight percentage: 55.0-70.0% of $SiO_2$; 15.0-20.0% of $Al_2O_3$; 0-10.0% of MgO; 0-12.5% of ZnO, and necessarily containing one of MgO and ZnO, and the crystallized glass thereof contains microcrystals of spinel crystal.

Furthermore, the high-hardness transparent glass ceramic further contains 0-10.0% of $ZrO_2$; 0-2.0% of $P_2O_5$; 0-7.0% of $TiO_2$; 0-1.5% of $Sb_2O_3$; 0-0.5% of $CeO_2$; 0-2.0% of $Na_2O$; 0-2.0% of $K_2O$; 0-2.0% of $Y_2O_3$; 0-1.0% of $La_2O_3$.

Furthermore, the content of MgO is 4-10.0% and/or ZnO is 4-12.5%. Furthermore, the Moh's hardness of the glass is greater than 7, and a visible light transmittance is greater than 80% through 1 mm of the glass.

A preparation method for a high-hardness transparent glass ceramic, comprising the following steps:

(a) Batching

Weighing raw materials based on the weight ratio, and then pouring into a mixer, and finally mixing uniformly to obtain a glass precursor material;

(b) Smelting

Feeding the above glass precursor material into a smelting furnace for melting and clarification at high temperature, dissolving the glass precursor material into a high temperature glass stock solution while removing bubbles and foreign matters from the high temperature glass stock solution;

(c) Molding and Annealing

Roughly annealing the molten and molded high temperature glass stock solution at a certain tapping temperature;

(d) Thermal Treatment

Placing the above roughly annealed glass into a high temperature furnace for thermal treatment, and then generating microcrystal of spinel crystal in the glass after thermal treatment, so as to obtain the high-hardness glass ceramic provided by the present invention.

Furthermore, with regard to the raw material in step (a), MgO, $Na_2O$ and $K_2O$ are introduced in the form of carbonate or nitrate or sulfate, and other components are introduced in the form of oxide.

Furthermore, for melting in step (b), the temperature is 1550-1600° C. and the time is 4-8 h; for clarification, the temperature is 1600-1650° C., and the time is 4-10 h.

Furthermore, in step (c), the tapping temperature is 1500-1600° C.; the molding is resulted by cooling in a hot die, or a float process or a profiling process.

Furthermore, the hot die refers to making sure that the die temperature is 100-200° C. during molding; the cooling means blowing and cooling the pre-heated die when the high temperature molten glass is poured into the die.

Furthermore, thermal treatment in step (d) comprises a crystal nucleus separation stage and a microcrystal growth stage; at the crystal nucleus separation stage, the temperature is required to be 650-800° C. and the time of duration to be 1-4 h; at the microcrystal growth stage, the temperature is required to be 850-1000° C., and the time of duration to be 0.5-4 h.

The present invention is advantageous in the following aspects: the proper precursor glass is subject to thermal treatment, and microcrystals are separated from a glass substrate by crystallization, in order to obtain the high-transparency high-hardness glass ceramic. The glass ceramic provided by the present invention is simple in preparation process and low in cost, thereby being applicable to mass production. Moreover, the Moh's hardness of high-hardness transparent glass ceramic herein is greater than 7, and the visible light transmittance through 1 mm of the glass is greater than 80%, so the glass ceramic has physical and chemical properties, including high transparency of glass and high hardness of ceramic. Furthermore, the glass ceramic provided by the present invention is featured by higher mechanical strength and heat stability, as well as better chemical stability, wear resistance, electrical insulating property, visible light and photochemical processing performances. Besides, the problem that normal optical glass is easy to be scratched can be overcome. Hence, the glass ceramic can be served as protective panel for mobile phones, protective glass for optical instruments and communication equipment, substrate for magnetic disks, and LCD panel or protective glass for other optoelectronic devices.

DETAILED DESCRIPTION

The high-hardness transparent glass ceramic provided by the present invention is prepared by applying a ZnO (MgO)—$Al_2O_3$—$SiO_2$ system to prepare a precursor glass during melting, and then annealing and thermally treating the precursor glass.

$SiO_2$, $Al_2O_3$ and MgO or ZnO constitute main components for the glass provided by the present invention. Based on a MgO (or ZnO)—$Al_2O_3$—$SiO_2$ phase diagram, the content of $SiO_2$ is 55.0-70.0%, the content of $Al_2O_3$ is 15.0-20.0%, the content of MgO is 0-10.0%, and the content of ZnO is 0-12.5% in the glass ceramic provided by the present invention. Moreover, the glass ceramic necessarily contains one of MgO and ZnO. When the contents of MgO and ZnO exceed this cope, other crystals will be generated in the glass. This will reduce the transparency of glass, failing to meet the requirements. Within the content scopes of the above components, magnesium aluminate spinel or/and gahnite microcrystal can be formed in the glass. Preferably, the content of MgO is 4-10.0%, and the content of ZnO is 4-12.5%.

$ZrO_2$, $P_2O_5$ and $TiO_2$ are nucleating agents for crystals in the glass. Various nucleating agents are generally used to promote more crystal nucleus, make the crystallized crystals small and uniform, and transmittance uniform. With high melting temperature, the content of $ZrO_2$ is generally no more than 10.0%; excessive $P_2O_5$ will lead to phase splitting, so its content is generally no more than 2.0%; as the main nucleating agent, the content of $TiO_2$ is generally no more than 7.0%. In case of excessive $TiO_2$, the hardness of titanate formed by nucleating is low, resulting in affecting the hardness of glass.

$Sb_2O_3$ and $CeO_2$ are clarifying agents, but are not used at the same time. The content of $Sb_2O_3$ is no more than 1.5% due to the fact that excessive $Sb_2O_3$ will not play the role in clarifying; the content of $CeO_2$ is no more than 0.5% on account that excessive $CeO_2$ will result in reduction of visible light transmittance of the glass.

$Na_2O$ and $K_2O$ are cosolvents capable of reducing the melting temperature and the clarification temperature. But, the contents of $Na_2O$ and $K_2O$ cannot exceed 2% since excessive $Na_2O$ and $K_2O$ will result in reduction of glass hardness.

$Y_2O_3$ and $La_2O_3$ are additional additives. On the premise that the glass hardness is not reduced, the melting temperature of glass can be reduced slightly. Moreover, the content of $Y_2O_3$ cannot exceed 2.0%, and the content of $La_2O_3$ also cannot exceed 1.0%.

The preparation method of the present invention comprises the following steps:

(a) Batching

Introducing MgO, Na2O and K2O by carbonate or nitrate or sulfate, and introducing other components in the form of oxide according to the weight composition of precursor glass. Weighing raw materials based on the weight ratio, and then pouring into a mixer, and finally mixing uniformly to obtain a glass precursor material;

(b) Smelting feeding the above glass precursor material into a smelting furnace for melting and clarification at high temperature, dissolving the glass precursor material into a high temperature glass stock solution while removing bubbles and foreign matters from the high temperature glass stock solution;

(c) Molding and Annealing

Molding the molten high temperature glass stock solution by cooling it in a hot die at a certain tapping temperature, or molding it with float process or profiling process, and then roughly annealing the molded glass in a muffle furnace;

(d) Thermal Treatment

Placing the above roughly annealed glass into a high temperature furnace or muffle furnace for thermal treatment, and then generating microcrystal of spinel crystal in the glass after thermal treatment, so as to obtain the high-hardness glass ceramic provided by the present invention.

A v-type mixer can be used as the mixer 7 for the step (a) mentioned above. For the step (b) mentioned above, the melting is conducted at high temperature, the temperature at 1550-1600° C., while the melting time at 4-8 h; the clarification is also conducted at high temperature, the clarification temperature at 1600-1650° C., while the time for the clarification at 4-10 h; the smelting furnace can be an electric furnace or crucible furnace. In the step mentioned above (c), the tapping temperature of a hot die is 1500-1600° C.; the hot die is used to ensure a die temperature of 100-200° C. during the process of molding; the cooling refers to blowing and cooling the pre-heated die when the high temperature molten glass is poured into the die; the thermal treatment in the step (d) mentioned above comprises a crystal nucleus separation stage and a microcrystal growth stage; at the crystal nucleus separation stage, the temperature is required to be 650-800° C. and the time of duration to be 1-4 h; at the microcrystal growth stage, the temperature is required to be 850-1000° C., and the time of duration to be 0.5-4 h.

In the present invention, a suitable precursor glass is subjected to thermal treatment, and microcrystals are separated from the glass substrate by crystallization, producing a high-hardness glass ceramic having a Moh's hardness greater than 7 or even greater than 7.5. The visible-light transparency rate of 1 mm of the glass is greater than 80%. The high-hardness glass ceramic prepared by the present invention is featured by higher hardness, higher mechanical strength and heat stability, as well as better chemical stability, wear resistance, electrical insulating property, transparency and photochemical processing performances. Hence, the glass ceramic can be served as protective panel for mobile phones, protective glass for optical instruments and communication equipment, substrate for magnetic disks, LCD panel, etc.

Embodiment 1

First, 62% of $SiO_2$, 18% of $Al_2O_3$, 10% of MgO, 5% of $TiO_2$, 3% of $ZrO_2$, 0.5% of $P_2O_5$, and 1.5% of clarifying agent $Sb_2O_3$ are weighed according to the weight ratio, and then all of them are put into a v-type mixer and fully mixed as the glass precursor material;

then, the prepared glass precursor material is fed into an electric furnace for melting at 1600° C. for 8 hours, and clarifying at 1650° C. for 10 hours, later, the molten glass is tapped at 1600° C., and molded through dies by cooling with cold air; the die temperature is 200° C., and the glass obtained is roughly annealed at 680° C. in a muffle furnace.

The glass obtained is put into a high temperature furnace for thermal treatment, and this thermal treatment process comprises a crystal nucleus separation stage and a microcrystal growth stage, wherein, at the crystal nucleus separation stage, the temperature in the muffle furnace is made to stay at 750° C. for 2 h, so that glass is made to generate as much crystal nucleus as possible, then the temperature in the muffle furnace goes up to about 950° C. for entering into the microcrystal growth stage and remains for 2 h, finally uniform magnesium aluminate spinel microcrystal can be generated in glass, thus obtaining high-hardness glass ceramic with a Moh's hardness of 8, and a visible-light transparency rate greater than 80% through 1 mm of the glass.

Embodiment 2

First, 60% of $SiO_2$, 20% of $Al_2O_3$, 8% of MgO, 1% of $K_2O$, 1% of $Na_2O$, 5% of $TiO_2$, 3% of $ZrO_2$, 0.5% of $P_2O_5$ and 1.5% of clarifying agent $Sb_2O_3$ are weighed according to the weight ratio, and then all of them are put into a mixer and fully mixed as the glass precursor material;

then, the prepared glass precursor material is fed into an electric furnace for melting at 1600° C. for 4 hours, and clarifying at 1650° C. for 4 hours, later, the molten glass is tapped at 1550° C. The glass obtained through float process is roughly annealed at 680° C. in a muffle furnace.

The glass obtained is put into a high temperature furnace for thermal treatment, and this thermal treatment process comprises a crystal nucleus separation stage and a microcrystal growth stage, wherein, at the crystal nucleus separation stage, the temperature in the muffle furnace is made to stay at 700° C. for 4 h, so that glass is made to generate as much crystal nucleus as possible, then the temperature in the muffle furnace goes up to about 900° C. for entering into the microcrystal growth stage and remains for 3 h, finally uniform magnesium aluminate spinel microcrystal can be generated in glass, thus obtaining high-hardness glass ceramic with a Moh's hardness of 8, and a visible-light transparency rate greater than 80% through 1 mm of the glass.

Embodiment 3

First, 55% of $SiO_2$, 20% of $Al_2O_3$, 10% of MgO, 2% of $K_2O$, 7% of $TiO_2$, 5.5% of $ZrO_2$, and 0.5% of clarifying agent $Sb_2O_3$ are weighed according to the weight ratio, and then all of them are put into a mixer and fully mixed as the glass precursor material;

then, the prepared glass precursor material is fed into an electric furnace for melting at 1550° C. for 8 hours, and clarifying at 1650° C. for 8 hours. Later, the molten glass is tapped at 1550° C., and the glass obtained through profiling process is roughly annealed at 680° C. in a muffle furnace.

The glass obtained is put into a high temperature furnace for thermal treatment, and this thermal treatment process comprises a crystal nucleus separation stage and a microcrystal growth stage, wherein, at the crystal nucleus separation stage, the temperature in the muffle furnace is made to stay at 700° C. for 4 h, so that glass is made to generate as much crystal nucleus as possible, then the temperature in the muffle furnace goes up to about 900° C. for entering into the microcrystal growth stage and remains for 4 h, finally uniform magnesium aluminate spinel microcrystal can be generated in glass, thus obtaining high-hardness glass ceramic with a Moh's hardness of 8, and a visible-light transparency rate greater than 80% through 1 mm of the glass ceramic.

Embodiment 4

First, 65% of $SiO_2$, 15% of $Al_2O_3$, 10% of MgO, 2% of $Na_2O$, 5% of $TiO_2$, 1% of $ZrO_2$, 0.5% of $P_2O_5$ and 1.5% of clarifying agent $Sb_2O_3$ are weighed according to the weight ratio, and then all of them are put into a mixer and fully mixed as the glass precursor material.

Other test conditions and steps are the same as Embodiment 3, i.e. uniform magnesium aluminate spinel microcrystal can be generated in glass, thus obtaining high-hardness glass ceramic with a Moh's hardness of 8, and a visible-light transparency rate greater than 80% through 1 mm of the glass.

Embodiment 5

First, 62% of $SiO_2$, 20% of $Al_2O_3$, 4% of MgO, 4% of ZnO, 1% of $K_2O$, 1% of $Na_2O$, 5% of $TiO_2$, 1% of $ZrO_2$ and 0.5% of $P_2O_5$ and 1.5% $Sb_2O_3$ are weighed according to the weight ratio, and then all of them are put into a mixer and fully mixed as the glass precursor material.

Other test conditions and steps are the same as Embodiment 3, i.e. uniform gahnite microcrystal can be generated in glass, thus obtaining high-hardness glass ceramic with a Moh's hardness of 8, and a visible-light transparency rate greater than 80% through 1 mm of the glass.

Embodiment 6

First, 65.0% of $SiO_2$, 16.0% of $Al_2O_3$, 12.5% of ZnO, 6.0% of $ZrO_2$ and 0.5% of $Sb_2O_3$ are weighed according to the weight ratio, and then all of them are put into a mixer and fully mixed as the glass precursor material;

then, the prepared glass precursor material is fed into an electric furnace for melting at 1600° C. for 8 hours, and clarifying at 1650° C. for 8 hours, later, the molten glass is tapped at 1600° C., and molded through dies by cooling with cold air; the die temperature is 200° C., and the glass obtained is roughly annealed at 680° C. in a muffle furnace.

The glass obtained is put into a high temperature furnace for thermal treatment, and this thermal treatment process comprises a crystal nucleus separation stage and a microcrystal growth stage, wherein, at the crystal nucleus separation stage, the temperature in the muffle furnace is made to stay at 800° C. for 4 h, so that glass is made to generate as much crystal nucleus as possible, then the temperature in the muffle furnace goes up to about 1000° C. for entering into the microcrystal growth stage and remains for 3 h, finally gahnite microcrystal can be generated in glass, thus obtaining high-hardness glass ceramic with a Moh's hardness of 8.0, and a visible-light transparency rate greater than 85% through 1 mm of the glass.

Embodiment 7

First, 60.5% of $SiO_2$, 16% of $Al_2O_3$, 12.5% of ZnO, 2.0% of $Y_2O_3$, 1.0% of $La_2O_3$, 1.0% of $Na_2O$, 0.5% of $K_2O$, 6.0% of $ZrO_2$ and 0.5% of $CeO_2$ are weighed according to the weight ratio, and then all of them are put into a mixer and fully mixed as the glass precursor material;

then, the prepared glass precursor material is fed into an electric furnace for melting at 1600° C. for 8 hours, and clarifying at 1650° C. for 8 hours, later, the molten glass is tapped at 1600° C., and molded through dies by cooling with cold air; the die temperature is 200° C., and the glass obtained is roughly annealed at 680° C. in a muffle furnace.

The glass obtained is put into a high temperature furnace for thermal treatment, and this thermal treatment process comprises a crystal nucleus separation stage and a microcrystal growth stage, wherein, at the crystal nucleus separation stage, the temperature in the muffle furnace is made to stay at 750° C. for 2 h, so that glass is made to generate as much crystal nucleus as possible, then the temperature in the muffle furnace goes up to about 950° C. for entering into the microcrystal growth stage and remains for 1 h, finally uniform gahnite microcrystal can be generated in glass, thus obtaining high-hardness glass ceramic with a Moh's hardness of 7.5, and a visible-light transparency rate greater than 80% through 1 mm of the glass.

Embodiment 8

First, 60% of $SiO_2$, 17.5% of $Al_2O_3$, 12.5% of ZnO, 2% of $Y_2O_3$, 1% of $La_2O_3$, 0.3% of $Na_2O$, 0.2% of $K_2O$, 6.0% of $ZrO_2$ and 0.5% of $CeO_2$ are weighed according to the weight ratio, and then all of them are put into a mixer and fully mixed as the glass precursor material;

then, the prepared glass precursor material is fed into an electric furnace for melting at 1600° C. for 8 hours, and clarifying at 1650° C. for 8 hours, later, the molten glass is tapped at 1550° C., and molded through dies by cooling with cold air; the die temperature is 100° C., and the glass sheet obtained is roughly annealed at 680° C. in a muffle furnace.

The glass obtained is put into a high temperature furnace for thermal treatment, and this thermal treatment process comprises a crystal nucleus separation stage and a microcrystal growth stage, wherein, at the crystal nucleus separation stage, the temperature in the muffle furnace is made to stay at 850° C. for 2 h, so that glass is made to generate as much crystal nucleus as possible, then the temperature in the muffle furnace goes up to about 950° C. for entering into the microcrystal growth stage and remains for 0.5 h, finally uniform gahnite microcrystal can be generated in glass, thus obtaining high-hardness glass ceramic with a Moh's hardness of 7.5, and a visible-light transparency rate greater than 80% through 1 mm of the glass.

Embodiment 9

First, 62% of $SiO_2$, 16% of $Al_2O_3$, 12.3% of ZnO, 2% of $Y_2O_3$, 1% of $La_2O_3$, 0.1% of $Na_2O$, 0.1% of $K_2O$, 6.0% of $ZrO_2$ and 0.5% of $CeO_2$ are weighed according to the weight ratio, and then all of them are put into a mixer and fully mixed as the glass precursor material.

Other test conditions and steps are the same as Embodiment 8, i.e. gahnite microcrystal can be generated in glass, thus obtaining high-hardness glass ceramic with a Moh's hardness of 8, and a visible-light transparency rate greater than 80% through 1 mm of the glass.

The invention claimed is:

1. A high-hardness transparent glass ceramic, wherein the components by weight percentage include: 55%-70% of $SiO_2$, 15%-20% of $Al_2O_3$, more than 0 to 10% of MgO, 3%-10% of $ZrO_2$, 0.5-2% of $P_2O_5$, and containing no ZnO, wherein the crystallized glass thereof contains microcrystals of spinel crystal, and wherein the Moh's hardness of the glass ceramic is greater than 7, and the visible-light transparency rate is greater than 80% through 1 mm.

2. The high-hardness transparent glass ceramic according to claim 1, further including: 0-7.0% of $TiO_2$; 0-1.5% of $Sb_2O_3$; 0-0.5% of $CeO_2$; 0-2.0% of $Na_2O$; 0-2.0% of $K_2O$; 0-2.0% of $Y_2O_3$; 0-1.0% of $La_2O_3$.

3. The high-hardness transparent glass ceramic according to claim 1, including: 4-10.0% of MgO.

4. A preparation method for the high-hardness transparent glass ceramic according to claim 1, comprising:
  (a) batching by weighing raw materials based on weight ratio, and then pouring into a mixer, and finally mixing uniformly to obtain a glass precursor material;
  (b) smelting by feeding the glass precursor material into a smelting furnace for melting and clarification at high temperature, and dissolving the glass precursor material into a high temperature glass stock solution while removing bubbles and foreign matters from the high temperature glass stock solution;
  (c) molding and annealing by molding the high temperature glass stock solution and then roughly annealing the molded high temperature glass stock solution at a predetermined tapping temperature; and
  (d) subjecting the roughly annealed glass to thermal treatment by placing the roughly annealed glass into a high temperature furnace for thermal treatment, and then generating microcrystal of spinel crystal in the glass after thermal treatment, so as to obtain the high-hardness glass ceramic.

5. The preparation method for a high-hardness transparent glass ceramic according to claim 4, wherein, with regard to the raw material in step (a), MgO, $Na_2O$ and $K_2O$ are introduced in the form of carbonate or nitrate or sulfate, and other components are introduced in the form of oxide.

6. The preparation method for a high-hardness transparent glass ceramic according to claim 4, wherein the melting in step (b) is: at 1550-1600° C., and lasting for 4-8 h; the clarifying is: at 1600-1650° C., and lasting for 4-10 h.

7. The preparation method for a high-hardness transparent glass ceramic according to claim 4, wherein the tapping temperature in step (c) is 1500-1600° C.; and the molding is achieved by cooling in a hot die, or by a float process or a profiling process.

8. The preparation method for a high-hardness transparent glass ceramic according to claim 7, wherein the molding in a hot die requires that the hot die be at a temperature is 100-200° C. during the molding; and the cooling is achieved by blowing and cooling the hot die during and/or after when the high temperature glass stock solution is poured into the hot die.

9. The preparation method for a high-hardness transparent glass ceramic according to claim 4, wherein the thermal treatment in step (d) comprises a crystal nucleus precipitation stage and a microcrystal growth stage; wherein at the crystal nucleus precipitation stage, the temperature is required to be 650-800° C. and the time of duration to be 1-4 h; and wherein at the microcrystal growth stage, the temperature is required to be 850-1000° C., and the time of duration to be 0.5-4 h.

10. The high-hardness transparent glass ceramic according to claim 2, including: 4-10.0% of MgO.

* * * * *